May 11, 1965 M. KROFTA 3,182,799
METHOD AND AN APPARATUS FOR PURIFYING THE UNCLARIFIED WASTE
WATER IN THE PAPER AND PULP AND LIKE INDUSTRIES
Filed Feb. 13, 1961 2 Sheets-Sheet 1

INVENTOR:

MILOS KROFTA
By Jacob L. Kollin
Attorney

INVENTOR:
MILOS KROFTA
By
Jacob L. Kollin,
Attorney

United States Patent Office 3,182,799
Patented May 11, 1965

3,182,799
METHOD AND AN APPARATUS FOR PURIFYING THE UNCLARIFIED WASTE WATER IN THE PAPER AND PULP AND LIKE INDUSTRIES
Milos Krofta, 58 Yokun Ave., Lenox, Mass.
Filed Feb. 13, 1961, Ser. No. 89,055
Claims priority, application Germany, Feb. 15, 1960, K 39,905
4 Claims. (Cl. 210—83)

The invention relates to a method and an apparatus for purifying the unclarified waste water in the paper and pulp and like industries, wherein the recovery of the solids is effected by flotation in which, after the introduction of gases, particularly air, possibly with the admixture of flocculation and/or wetting agents, into the unclarified waste water, the rising bubbles of gas entrain the solids by reducing their specific gravity and float upwards so that they collect on the surface of the water from whence they can be drawn off.

In an earlier method, the inventor proposed that the unclarified waste water mixed with gas, particularly air, should be introduced into a container in the centre, under at least one plate-shaped partition wall with a superstructure in the form of an inverted funnel. In this case, the rising bubbles of gas become charged with the solid particles, slide outwards along the baffle and float upwards from the edge of the baffle along the tapered surface to a collecting point, while the clarified waste water flows upwards separately and in another direction to a second collecting point.

The method works well and permits adequate separation of the solids from the waste water to be clarified. It is a disadvantage, however, that the devices necessary for carrying out the method require a comparatively large amount of space and are expensive.

In order to change this, the invention proposes a modification of the earlier method which consists in that the unclarified waste water, mixed with gas, is divided according to the invention, into the narrowest possible flow paths situated one above the other, by suitable means such as baffles having a plane surface and inclined in the same direction, and the bubbles of gas charged with the solid particles float obliquely upwards along the surface of the individual paths, for example along the baffles, and up from the edge of the baffles to a collecting point, while the clarified waste water is taken in the lower parts of the flow paths, for example below the baffles, substantially in counterflow to the upward floating solid particles, to a separate second collecting point.

It is known that the output of a flotation clarifying plant in litres per minute is substantially a function of the surface available for the flotation. As a result of the division according to the invention into a large number of superimposed flow paths, the total surface which is available for the clarifying action is considerably increased, and hence also the throughput, as a result of which the capacity is substantially increased while the apparatus has a small base area and takes up little room.

The unclarified waste water is preferably divided into superimposed flow paths which are preferably alike and which may conveniently be low in height. The lengths of the flow paths preferably decrease from the bottom upwards in such a manner that the solid particles floating upwards from the individual flow paths do not interfere with one another.

In order to prevent interruption of the preferably continuous flotation process in the event of failure in the supply of unclarified waste water or other breakdowns, it is further proposed that the method according to the invention should be carried out in such a manner that the unclarified waste water flows into a reservoir from which, after being mixed with gases, it is conveyed to the flotation by a conveying means, and some of the pure water obtained during the flotation flows into this reservoir, preferably automatically, when the supply of unclarified waste water decreases or ceases.

The invention further relates to an apparatus for carrying out the method. This apparatus consists of a container of any desired cross-section, preferably substantially square or rectangular, with a plurality of built-in baffles, which are spaced apart one above the other and inclined in the same direction, preferably running parallel to one another, and which form between them shallow but substantially wide compartments. These compartments are open at their upper ends and closed at their lower ends apart from a narrow cross-sectional outlet at the bottom. There, in the vicinity of the upper surface of each compartment, is installed a supply pipe for the unclarified waste water, which preferably extends over its whole width. Below this are preferably deflector surfaces which prevent the unclarified water from flowing directly into the outlets from the compartments. These outlets lead into a collecting chamber for the clarified water, from the top of which the clarified water can be drawn off or flow away through a conduit. The upper open ends of the individual compartments comprise a gap between the edges of their upper surfaces and the neighbouring wall of the container, in which gap the solids being separated float upwards to collect in a layer at or on the surface of the water in this part of the whole container. Since, by the law of communicating pipes, all parts of the container have substantially the same water level, this is adjusted in such a manner that the floated solid particles pass over an overflow into the collecting chamber for the thick substance to which the discharge pipe for the thick substances is connected.

The edges of the upper surfaces of the upper ends of the superimposed compartments are preferably at a distance which increases from the bottom upwards but remains constant for each one, from the inner face of the associated container wall, with contours which substantially correspond to the course of the wall.

If an automatic flotation apparatus is desired, which works continuously, then in a further development of the apparatus according to the invention, a collecting tank is provided on the one hand with the inlet conduit for the unclarified waste water and on the other hand with the outlet conduit to the feed pump in the container equipped with the baffles. The collecting tank is equipped with an aperture for the admission of clarified water, which aperture is held closed by the pressure of the unclarified waste water, if necessary with the aid of an auxiliary force, for example a weight. Clarified water enters as soon as a reduced pressure prevails on the opposite side so that in the event of breakdowns in the supply of unclarified waste water there is no interruption in the circulation within the flotation container. This collecting tank may conveniently be above the container provided with the baffles and is preferably combined therewith to form one unit.

Further details of the invention will be explained with reference to the example of an embodiment, illustrated diagrammatically in the drawing, for carrying out the method according to the invention. In the drawing.

Figure 1:
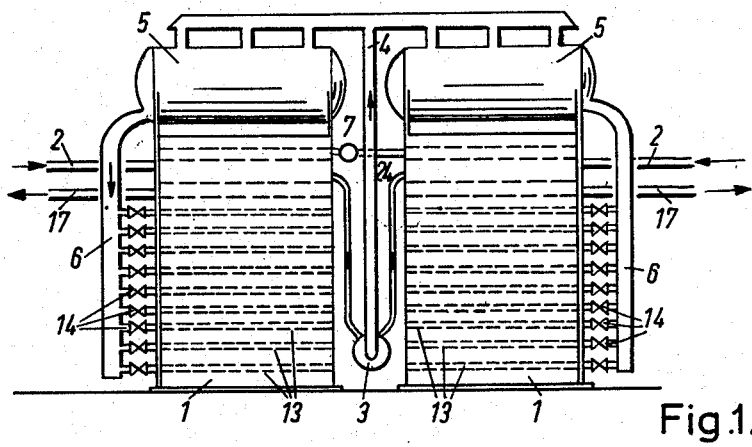
FIGURE 1 shows, in side elevation, a flotation apparatus composed of two units.

Each of the flotation units illustrated, like the apparatus for carrying out the inventor's earlier method, consists of a container 1 which is preferably open at the top and to which the unclarified waste water is supplied through the pipeline 2. The delivery of the unclarified waste water to the container 1 is effected through the pump 3 and the conduit 4 to the pressure tank 5. From here, the unclarified waste water charged, for example, with air, passes through the conduit 6 into the interior of the container 1. The thick-substance pump 7 draws off the thick substances separated out in the container.

Figure 2:
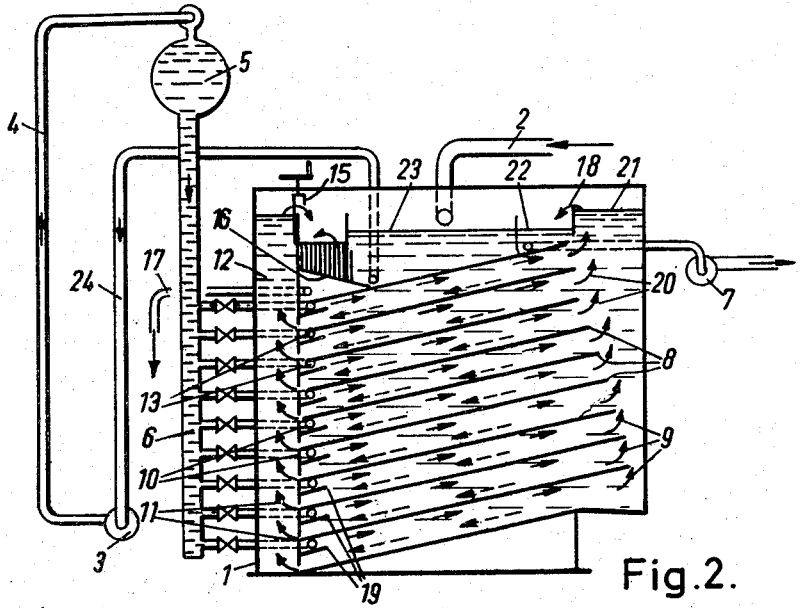
FIGURE 2 is a longitudinal section through one of the units shown in FIGURE 1, on a larger scale.
Figure 3:
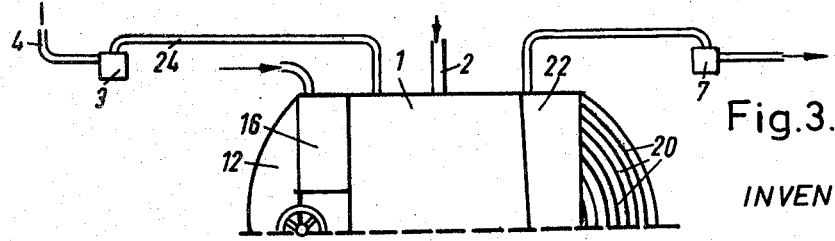
FIGURE 3 is a plan view of such a unit.

According to the invention, as shown in particular in FIGURE 2, a plurality of baffles 8, which lie one above the other at a comparatively short distance apart, and rise in the same direction from a low level at the left to a higher level at the right, running parallel in the example, is installed in the interior of each container 1. Between them, these baffles form shallow and relatively wide compartments 9. These are open at their right-hand, upper ends. At the opposite, lower ends, there are provided end faces 10 which close the compartments 9 apart from an outlet cross-section 11 at the bottom. These end faces 10 together constitute a partition which forms a wall of collecting chamber 12. This outlet cross-section may consist of a plurality of small holes. These outlet cross-sections lead into the collecting chamber 12 which passes through a container 1 from top to bottom. At the lower end, adjacent to the upper surface, each compartment 9 comprises an admission conduit 13 for the unclarified waste water, which conduit extends over its whole width. Each individual conduit can be regulated by valves 14. At the upper end of the collecting chamber 12 there is provided an overflow 15 which finally leads into a trough 16 from whence another conduit 17 leads to the outside. At the opposite side of the container, a second overflow 18 is provided. Both overflows may be adjustable in height and determine the height to which the water rises in the container. The apparatus works as follows:

Unclarified waste water is introduced into the individual pipes 13 in the compartments 9. In order that the waste water may not emerge too quickly through the outlet cross-sections 11, deflectors 19 are installed which run substantially parallel to the upper surfaces of the compartments. The solid particles, which are surrounded or entrained by the gas, float along the upper surfaces of the compartments which run obliquely upwards and serve as baffles, the particles travelling from left to right and upwards from the edge, as indicated by solid arrows. The clarified waste water, represented by broken arrows, flows substantially in the opposite direction through the outlet cross-sections 11 into the collecting chamber 12 for the clarified water. In order that the solid particles floating upwards may interfere with one another as little as possible, the gaps 20 between the upper surfaces of the compartments and the following container wall increase from the bottom upwards. In this manner, the thick substances collect on the surface of the water at 21 and pass over the overflow 18 into a collecting chamber 22 from whence they are removed by the thick-substance pump 7. Finally, at the overflow 15, clarified water flows into the trough 16 below and from there through the conduit 17 for further use.

These devices are sufficient for carrying out the method of the invention correctly.

Figure 4:
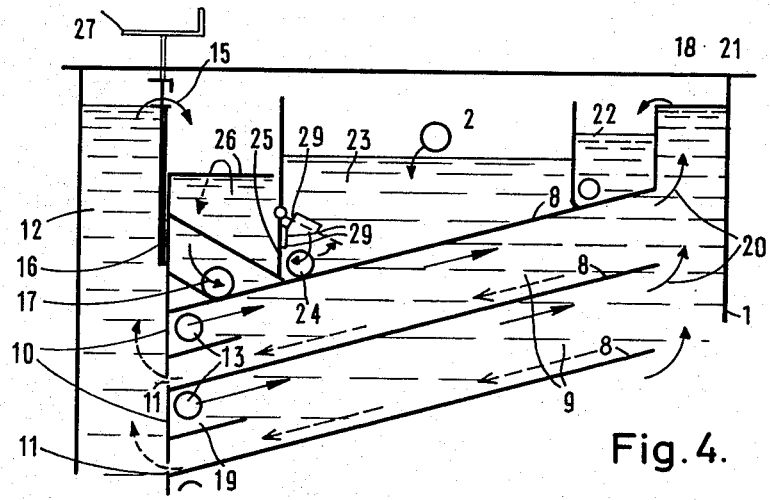
FIGURE 4 shows the longitudinal section of FIGURE 2 on a larger scale through the upper part of the apparatus.
Figure 5:
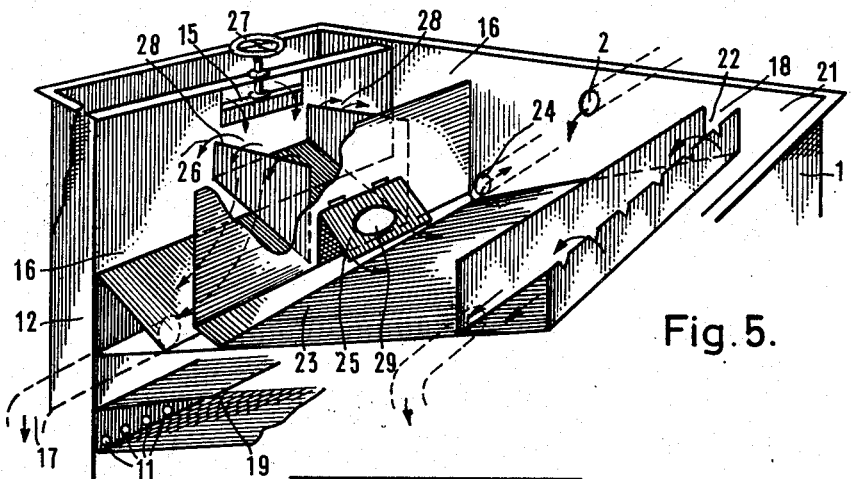
FIGURE 5 illustrates diagrammatically the details of FIGURE 4.
Figure 6:
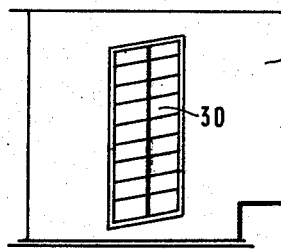
FIGURE 6 shows one unit in side elevation but with the omission of all the other devices illustrated in FIGURES 1 to 3.

In the example, an auxiliary device is illustrated which permits operation without attention so that occasional checks are sufficient to ensure continuous satisfactory separation of the solid particles. This auxiliary device is illustrated in essence in FIGURES 4 and 5. It consists of a collecting tank 23 which follows the topmost compartment and is combined with the container 1 to form one unit. The supply conduit 2 for the unclarified waste water leads into this collecting tank. The pressure pump 3 which affords the passage of the unclarified waste water through the container 1, is connected to this collecting tank by its suction line 24. The right-hand boundary of the collecting tank is simultaneously part of the collecting chamber 22 in which the thick substances are collected and from which they are drawn off by the thick-substance pump 7. An aperture, which can be closed by means of a flap 25 which can be swung into the collecting tank, is provided in the left-hand wall of the collecting tank. This aperture leads into a central container 26 which occupies part of the space as far as the closing wall of the collecting chamber 12 for the clarified water. This central container 26 bridges part of the collecting trough 16 for the clarified water, which trough extends over the whole width of the container and from which the clarified water flows away or can be pumped out through the conduit 17. The clarified water flows into the central container 26 over the overflow 15. In the illustration shown in FIGURES 4 and 5, the adjusting device for the overflow 15 is represented by a setting handwheel 27. The clarified water running into the container 26 over the overflow edge 15 passes over the two side walls 28 into the collecting tank 16 so long as the flap 25 is closed. The closed position is maintained on the one hand by the hydrostatic pressure of the unclarified waste water in the collecting tank 23, which may be reinforced by an additional weight 29. If the level of the liquid in the collecting tank 23 drops too far, which occurs if the supply of unclarified waste water becomes inadmissibly low or ceases entirely for any reason, then the connecting flap 25 opens under the hydrostatic pressure in the central container 26, which is now higher, and clarified water flows into the collecting container 23. This moment is shown in FIGURE 5. This ensures that the pressure pump 3 can always deliver continuously and the flow inside the container 1 is not interrupted even when no more unclarified waste water is flowing out. FIGURE 6 shows an observation port provided in one side wall of the container 1, in the form of a cleanout door 30 which is provided with bulletproof glass or like transparent material. For the first time it permits observation of each individual flow path in operation so that any faults which develop can be detected and removed immediately.

I claim:

1. Method for purifying unclarified waste water in the paper, pulp and like industries, comprising introducing unclarified waste water mixed with gas into a container, conveying the waste water along a plurality of upwardly inclined narrow paths to one collecting station thereby dividing the waste water into a plurality of wide, shallow superimposed moving layers of waste and into a plurality of layers of clarified water, moving the plurality of layers of clarified water below said waste layers in a downwardly inclined path to another collecting point, said paths decreasing in length from the bottom upwards so that the solid particles do not interfere with one another at said one collecting station, conducting the waste particles to a third collecting station, providing a fourth collecting station in the upper part of the container, adjustably feeding said fourth collecting station from said other station with clarified water when the supply of unclarified waste water ceases, recirculating said clarified water from said fourth collecting station through the plurality of paths, and discharging the unclarified waste and the clarified water, respectively, from said container.

2. Apparatus for purifying unclarified waste water in the paper, pulp and like industries, comprising a substantially rectangular container having a pair of parallel walls and a closed bottom; a partition extending vertically from said bottom and spaced from one of said walls and forming with one of said walls and its respective adjacent walls a collecting chamber for clarified water, said partition having a plurality of horizontally extending outlets for the passage of clarified water into said chamber; a plurality of parallel vertically spaced baffles secured to said partition at the bottom edges of said outlets and extending obliquely to said partition in an upward direction, said baffles having free edge portions spaced from the other of said walls, said edges forming with said other wall a passage for solid particles; a plurality of deflectors extending part way from said partition respectively and spaced parallelly to said baffles; admission conduits for unclarified waste water disposed between each of said baffles and a respective deflector; a first overflow trough for clarified water extending along said partition above said plurality of baffles; a second overflow trough secured along the free edge of the uppermost of said baffles and spaced from said other wall and said first trough to form a collecting tank with said first trough; means to supply the unclarified liquid into said collecting tank; valve means in said collecting tank for allowing the passage of clarified water into said collecting tank when the supply of unclarified waste water ceases, said partition having an overflow above said first trough for allowing a flow of clarified water into said first trough, pump means for conducting thick substances from said second trough, and pump means for conducting the clarified water from said tank means to provide fluid communication between the collecting tank and the admission conduits.

3. Apparatus for purifying unclarified waste water in the paper, pulp and like industries, comprising a substantially rectangular container having a pair of parallel walls and a closed bottom; a partition extending vertically from said bottom and spaced from one of said walls and forming with one of said walls and its respective adjacent walls a collecting chamber for clarified water, said partition having a plurality of horizontally extending outlets for the passage of clarified water into said chamber; a plurality of parallel vertically spaced baffles secured to said partition at the bottom edges of said outlets and extending at an angle to said partition in an upward direction, said baffles having free edge portions spaced from the other of said walls, said edges forming with said other wall a passage for solid particles; a plurality of deflectors extending part way from said partition respectively and spaced parallelly to said baffles; admission conduits for unclarified waste water disposed between each of said baffles and a respective deflector; a first overflow trough for clarified water extending along said partition above said plurality of baffles; a second overflow trough secured along the free edge of an uppermost of said baffles and spaced from said other wall and said first trough to form a collecting tank with said first trough; means to supply the unclarified liquid into said collecting tank; weight operated valve means in said collecting tank for allowing the passage of clarified water into said collecting tank when the supply of unclarified waste water ceases, said partition having a passage above said first trough for allowing a flow of clarified water into said first trough, pump means for conducting thick substances from said second trough, and pump means for conducting the clarified water from said tank means to provide fluid communication between the collecting tank and the admission conduit.

4. The apparatus according to claim 3, further provided with means for adjusting the height of the overflow.

References Cited by the Examiner
UNITED STATES PATENTS

| | | | |
|---|---|---|---|
| 2,525,936 | 10/50 | Owen | 210—521 X |
| 2,646,882 | 7/53 | Frost | 209—170 |
| 2,920,763 | 1/60 | Lind et al. | 210—196 X |

GEORGE D. MITCHELL, *Primary Examiner.*
HERBERT L. MARTIN, *Examiner.*